(12) United States Patent
Morrien

(10) Patent No.: US 6,415,325 B1
(45) Date of Patent: Jul. 2, 2002

(54) TRANSMISSION SYSTEM WITH IMPROVED SYNCHRONIZATION

(75) Inventor: Albertus M. Morrien, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/212,631

(22) Filed: Dec. 16, 1998

(30) Foreign Application Priority Data

Dec. 16, 1997 (EP) .............................................. 97203959

(51) Int. Cl.⁷ .............................................. G06F 15/16
(52) U.S. Cl. ...................... 709/230; 709/218; 713/400; 713/500; 713/600; 711/108; 711/158
(58) Field of Search .................................. 709/230, 218, 709/219, 223; 711/108, 158; 713/400, 500, 600, 601

(56) References Cited

U.S. PATENT DOCUMENTS

| | | | | |
|---|---|---|---|---|
| 5,742,623 A | * | 4/1998 | Nuber et al. ................. | 714/798 |
| 5,760,737 A | * | 6/1998 | Brenner ....................... | 342/357 |
| 5,854,816 A | * | 12/1998 | Kim et al. .................... | 375/376 |
| 5,862,136 A | * | 1/1999 | Irwin .......................... | 370/395 |
| 5,864,682 A | * | 1/1999 | Porter et al. ................. | 709/247 |
| 5,898,666 A | * | 4/1999 | Fukuda et al. ............... | 370/280 |
| 5,898,734 A | * | 4/1999 | Nakamura et al. .......... | 375/287 |
| 5,943,481 A | * | 8/1999 | Wakeland .................... | 370/466 |
| 6,041,051 A | * | 3/2000 | Doshi et al. ................. | 370/352 |
| 6,058,427 A | * | 5/2000 | Viswanath et al. .......... | 709/231 |
| 6,070,223 A | * | 5/2000 | Yoshizawa et al. .......... | 711/108 |
| 6,076,115 A | * | 6/2000 | Sambamurthy et al. ..... | 709/250 |
| 6,192,251 B1 | * | 2/2001 | Jyogataki | |

FOREIGN PATENT DOCUMENTS

WO        WO9639762        12/1996        ............. H04J/3/06

OTHER PUBLICATIONS

"Bt8222 ATM Receiver/Transmitter with UTOPIA Interface", Brooktree, San Diego CA.
"Bt8510E1 Controller with Physical Line Interface", Brooktree, San Diego CA.
"ITU–T Standard G.804".

* cited by examiner

Primary Examiner—James P. Trammell
Assistant Examiner—Albertus Morrien
(74) Attorney, Agent, or Firm—Daniel J. Piotrowski

(57) ABSTRACT

In an ATM over STM transmission system, comprising a transmitter and a receiver, a local clock in the receiver has to be synchronized to a clock in the transmitter. To achieve said synchronization, the receiver comprises timing signal extraction means which generates a timing signal each time a first byte of an ATM cell is received in a first byte of an STM frame. Due to the periodically occurrence of the timing signal this is very suitable for synchronizing a local clock. In an advantageous embodiment of the invention, a timing reference value is transmitted by the transmitter to the receiver. This timing reference signal is temporarily stored in a buffer in the receiver. At the instant the timing signal is present at the output of the timing extraction means the content of the buffer is loaded into the clock counter.

12 Claims, 3 Drawing Sheets

TRANSMISSION SYSTEM WITH IMPROVED SYNCHRONIZATION

BACKGROUND OF THE INVENTION

The present invention is related to a transmission system comprising a first node for transmitting packets in a synchronous frame to a second node. The invention is also related to a transmitter, a receiver, a method and a signal.

A transmission system according to the preamble is known from ITU-T Standard G.804.

Such transmission systems are applied where packet switched data such as ATM data has to be transmitted over a synchronous data link said such as a PDH (Plesiochronous Digital Hierarchy) or SDH (Synchronous Digital Hierarchy) link. This can be useful for transmitting video information in ATM format over an existing transmission path using PDH or SDH. For such transmission the packets are embedded in the synchronous signal in a prescribed manner. One way of embedding ATM packets is prescribed in the above mentioned G.804 standard. In the above mentioned standard it is not prescribed how to transfer accurate timing information in said ATM packets.

SUMMARY OF THE INVENTION

The object of the present invention is to provide a transmission system according to the preamble in which it is possible to transfer accurate timing information in said packets.

To achieve this object the present invention is characterized in that the second node comprises timing extraction means for extracting a timing signal when a predetermined symbol in a packet is transmitted in a predetermined position in the frame.

The present invention is based on the recognition that it is possible to extract accurate timing information from the signal if this timing signal is extracted when a predetermined symbol in a packet appears at a predetermined position in the frame. In the example of carrying ATM packets in G.704 frames, 53 bytes ATM packets are carried in a plurality of frames, each of them carrying 30 bytes. In this case the first byte of an ATM cell coincides with the first byte of a G.704 frame each 53 frames. With a frame period of 125 µs, said first byte of an ATM packet will coincide with the first byte of a frame each 53·125 µs 6.625 ms.

Consequently an accurately defined timing signal can be obtained from the ATM signal by generating a timing signal at the instant on which the first byte of an ATM frame corresponds to the first byte of a G.704 frame.

An embodiment of the invention is characterized in that the first node comprises timing information transmission means for transmitting a clock reference value to the second node, and in that the second node comprises synchronization means for synchronizing at arrival of the timing signal a local clock with the clock reference value.

In this embodiment of the invention it is possible to synchronize a local clock in the second node with a clock in the first node. Both clocks can have a frequency which is unrelated to the clock frequencies involved with the signals transmitted over the transmission path.

A further embodiment of the present invention is characterized in that the timing reference value corresponds to an expected clock value at arrival of the next timing signal at the second node.

In this embodiment, the clock in the second node can easily be set to the timing reference value received earlier. This in a very simple and effective way to synchronize the clock in the second node to the clock in the first node.

A still further embodiment of the present invention is characterized in that the second node comprises clock information transmission means for transmitting a clock reference value derived from its local clock to the first node, in that the first node comprises adaptation means for adapting the clock reference value in dependence on the clock reference received from the second node.

This embodiment allows the automatic compensation of the transmission delay between the two nodes. If a transmission delay D is present between the first and second node, the clock in the second node will be a time D behind the clock in the second node, because the timing signal arrives a time D later at the second node than the arrival time assumed by the first node.

By transmitting to the first node, a clock reference signal derived from the clock in the second node, a clock reference signal is received by the first node being 2D later than the clock reference in the first node. By comparing the present clock value in the first node with the clock reference signal transmitted by the second node the value of D can be determined by the first node. Consequently the first node can adapt the clock reference value transmitted to the second node to compensate for the measured delay.

BRIEF DESCRIPTION OF THE DRAWINGS

The invention will now be explained in more detail with reference to the drawing figures. Herein shows.

DESCRIPTION OF THE PREFERRED EMBODIMENTS

Figure 1:
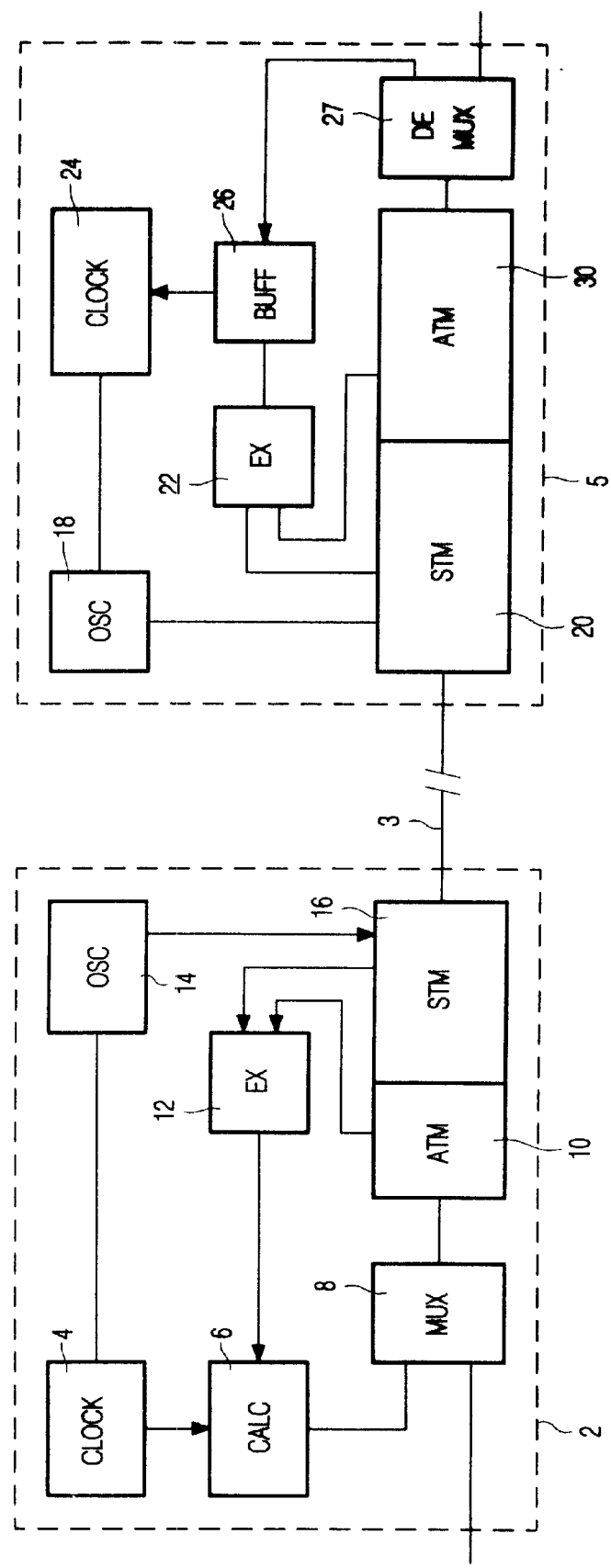
FIG. 1, a first embodiment of the transmission system according to the invention.

In the transmission system according to FIG. 1, a reference clock signal is generated by an oscillator 14. This reference clock signal is applied to a reference clock counter 4.

A further reference clock signal generated by the oscillator 14 is applied to the STM frame assembler 16. Local timing extraction means 12 receive from the STM frame assembler 16 a signal indicating the transmission of a predetermined symbol by said STM frame assembler 16. Said predetermined symbol is here a first byte of an STM frame.

The ATM packetizer 10 provides a signal indicating the presence of a predetermined byte in a transmitted ATM cell to the local timing extraction means 12. This predetermined byte is here the first byte in an ATM cell. The local timing extraction means 12 derive a local timing signal by comparing the difference between the instant a new STM frame is started and the first instant thereafter at which a first byte of an ATM packet is transmitted. If this difference is zero, the first byte of the present STM frame corresponds to a first byte of an ATM cell, and consequently a timing signal is presented at the output of the local timing extraction means 12.

The timing signal generated by local timing extraction means 12 cause the calculator 6 to calculate the expected value of the clock counter 4 at the next occurrence of the timing signal from the current content of the clock counter 4. This expected value can be obtained by adding the content of the clock counter and an offset value. The offset value is equal to the increase of the clock counter 4 in the period between two instances of the timing signal. The offset value can easily be determined by the calculator 6 by subtracting the count values of the clock counter 4 at two subsequent instances of the timing signal.

The expected value of the clock counter 4 present at the output of the calculator 6 is included in an ATM packet and transmitted to the second node well before the occurrence of the next timing signal.

When an E1 signal (2.048 Mbit/sec) is used over the transmission medium, the function of the STM frame assembler 10 and the ATM packetizer 16 can e.g. be performed by a combination of the Brooktree Bt8222 ATM Receiver/Transmitter with UTOPIA interface and the Brooktree Bt8510 E1 controller with Physical Line Interface. The Bt8222 and the Bt8510 data sheets are published by Brooktree Corporation.

In the second node 5, the signal from the first node is received, and the ATM packets are extracted from the STM signal by the STM disassembler 20 and passed to an ATM depacketizer 30. The ATM depacketizer 30 extracts the expected value of the clock counter 4 from the ATM packet carrying it. A demultiplexer 27 receives the output signal of the ATM depacketizer and passes the packet carrying the expected value of the clock counter 4 to the buffer 26.

The receiver 5 comprises an oscillator 18 which generates similar signals as the oscillator 14. The oscillator 18 is synchronized to the clock of the signal received from the transmission medium 2 by a clock signal extracted from said received signal by the STM frame disassembler 20.

At an output of the STM frame disassembler 20, a signal is available, indicating the instances on which a new frame of the STM input signal starts. This signal is provided to the timing extraction means 22. The ATM depacketizer 30 generates a signal indicating the occurrence of a first byte in an ATM cell. The timing extraction means 22 are arranged for comparing the difference between the instant a new STM frame is received and the first instant thereafter at which a first byte of an ATM cell is received. If this difference is zero, the first byte of the present STM frame corresponds to a first byte of an ATM cell, and consequently a timing signal is presented at the output of the timing extraction means 22.

It is observed that a processing delay of the ATM packets in the depacketizer 30 can cause that the signal indicating a first byte of an ATM cell which coincides with the first byte of an STM frame arrives later than the signal indicating said first byte of the STM frame. This problem can easily solved by subjecting the signal indicating the first byte of the STM frame to a compensating delay.

In response to the timing signal at the output of the timing extraction means, the content of the buffer 26 is loaded into the clock counter 24. Consequently the clock counter 24 carries the same value as the clock counter 4.

In the case the delay caused by the transmission medium 3 is not negligible for the synchronization purposes, a correction for this delay should be included in the value transferred to the clock counter 24 at the instant the timing signal occurs. This correction can comprise addition of an offset value to the expected value of the clock counter 4. This correction value can be added in the transmitter 2 to the value to be transmitted, or it can be added in the receiver to the count value received by the receiver 5. The function of the STM disassembler 20 and the ATM depacketizer can also be performed by the combination of a Brooktree Bt8222 and a Bt8510 as discussed above, because the Bt8222 and Bt8510 comprise all required transmission and reception functions.

Figure 2:
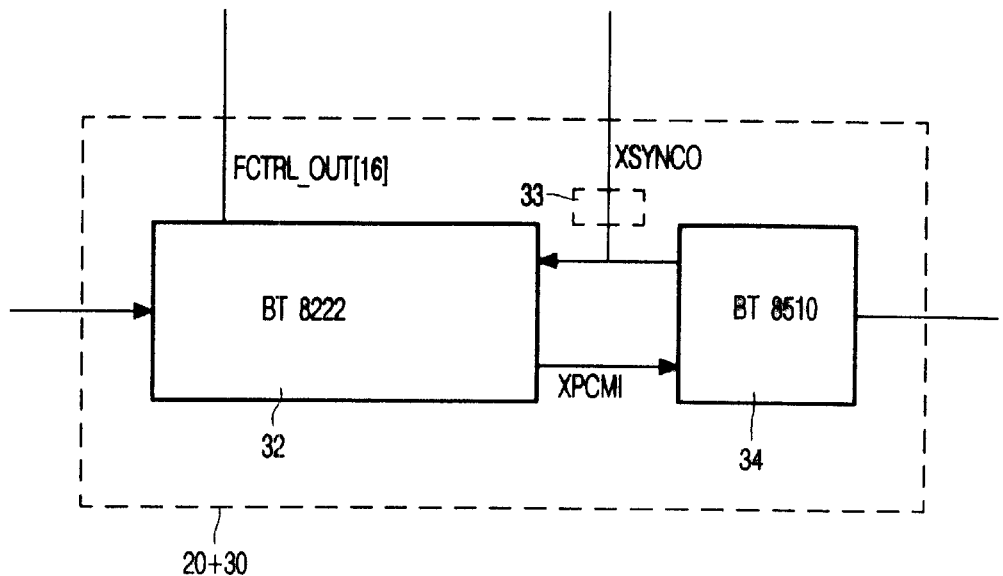
FIG. 2, a block diagram of the STM frame assembler 16 in FIG. 1.

FIG. 2 shows the implementation of the combination of the ATM packetizer 10 and the STM assembler 16 by means of a combination of a Bt8222 and a Bt8510. It is assumed that the line signal is compliant with ITU-T standard G.704. The Bt8222 receives the 53 bytes to be packed into a single ATM cell one by one. The BT8222 presents a signal FCTRLOUT[16] at an output to indicate that the next byte to be read is the first byte of a new ATM packet. This signal is used by the local timing extraction means 12 as indication that a new ATM cell is to be transmitted.

A further output of the Bt8222, carrying an output signal XPCMI, is connected to an input of the Bt8510. The signal XPCMI comprises the bytes to be assembled into a PCM frame according to G.704. An output of the Bt8510 carrying an output signal XSYNCO is connected to an input of the Bt8222. The signal XSYNCO provides a multi-frame timing signal to the Bt8222. This signal has a rising edge at the beginning of each time slot 0 of a new multi-frame (once per 16 frames). It is possible to carry out the synchronization on basis on this multi-frame timing signal XSYNCO, but if it is desired to carry out the synchronization more frequently (e.g. once per frame) a frequency multiplier 33 should be introduced to obtain a frame timing signal from the multi-frame timing signal. Such a frequency multiplier can be realized by means of a PLL having a frequency divider with a dividing factor 16 in its feedback path.

The serial G.704 PCM output signal, carrying the ATM cells applied at the input of the Bt8222, is available at a further output of the Bt8510.

Figure 3:
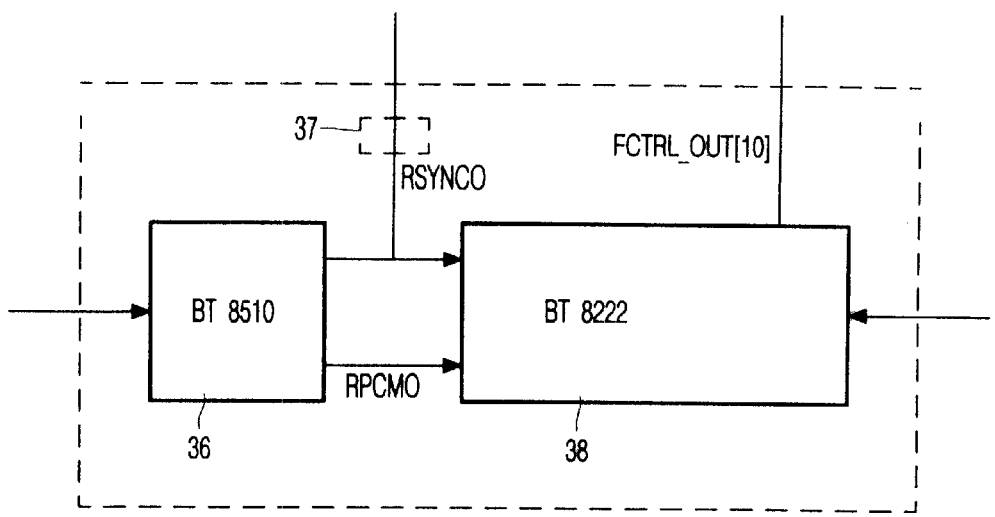
FIG. 3, a block diagram of the STM frame disassembler 20 in FIG. 1.

FIG. 3 shows an implementation of the combination of the STM-disassembler 20 and the ATM depacketizer 30 by using a combination of a Bt8510 and a Bt8222 device. A 2,048 Mbit/s signal according to the G.704 standard, is applied to an input of the Bt8510 device. A first output of the Bt8510 device, carrying as output signal a multi-frame synchronization signal RSYNCO is connected to a multi-frame synchronization input of the Bt8222 device and to an output of the combination of the elements 20 and 30. This output signals the presence of the first byte of a new multi-frame which occurs every $16^{th}$ frame. Consequently the synchronization according to the present invention is only possible at the beginning of multi-frames. If this is undesired, a frequency multiplier 37 can be user to obtain a signal that indicates the presence of the first byte of each new frame. As explained already in the explanation of the embodiment of FIG. 2, such a frequency multiplier can be realized by means of a phase locked loop.

A second output RPCMO of the Bt8510 device carrying ATM packets, is connected to a second input of the Bt8222 device. At a first output of the Bt8222 device a signal FCTRL_OUT[10] indicating the first byte of a new ATM cell is available for use in the timing extraction means 22. At a second output of the Bt8222 device the payload bytes carried by the ATM cells are available.

Figure 4:
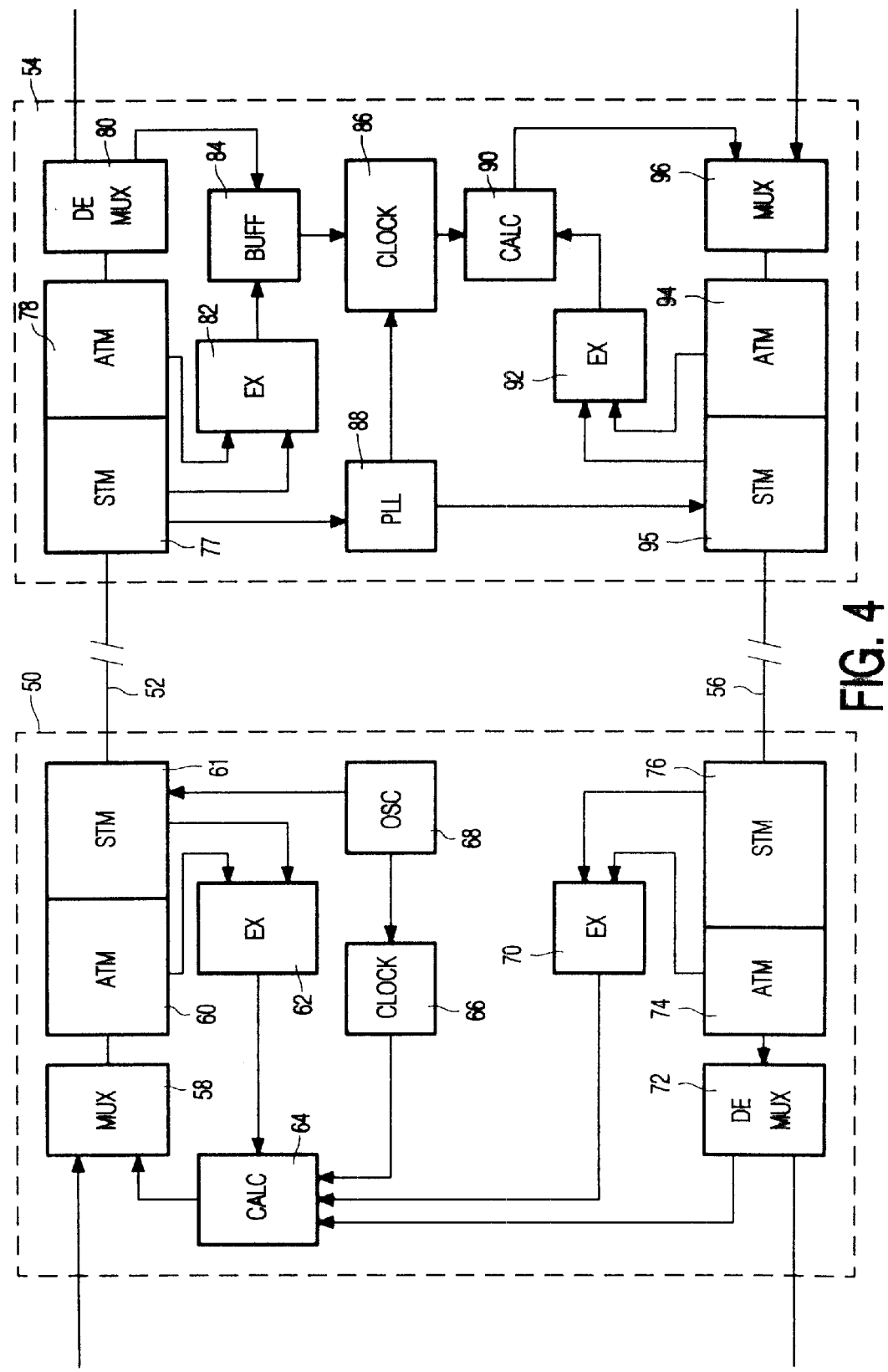
FIG. 4, a second embodiment of the transmission system according to the invention in which the transmission delay between the nodes is automatically compensated.

In the arrangement according to FIG. 4 a first transceiver 50 is coupled via a full duplex transmission link comprising channels 52 and 56 to a second transceiver 54. In the first transceiver 50 a payload signal to be transmitted is applied to a first input of a multiplexer 58. An output of calculation means 64 is connected to a second input of the multiplexer 58. An output of the multiplexer 58 is connected to an input of an ATM packetizer 60. An output of the ATM packetizer 60, carrying a signal indicating the first byte of a new ATM cell, is connected to a first input of local timing extraction means 62. An output of the STM frame assembler 61, carrying a signal indicating the first byte of a new STM frame, is connected to a second input of local timing extraction means 62.

The assembled ATM cells are passed to a G.804 frame assembler which assembles the ATM cells in a G.704 compliant 2,048 Mbit/sec signal. This signal is available at a first output of the frame assembler 61.

The local timing extraction means are arranged for extracting a timing signal indicating the transmission of a predetermined byte of an ATM packet in a predetermined position in a G.704 frame. In the present embodiment the timing signal is generated when a first byte of an ATM packet is transmitted in a first byte of an STM frame.

A clock signal generated by a clock oscillator 68 is applied to a clock counter 66 which counts the clock pulses from the clock oscillator 68 in order to obtain a time reference. The output of the clock counter 66 is connected to a first input of the calculation means 64. The calculation means 64 are arranged for determining an expected value of the clock counter 66 when the next timing signal is extracted by timing extracting means 82 in the transceiver 54.

The calculation means 64 calculate the expected value $EX_{66}(T_E)$ of the clock counter 66 at instant $T_E$ to be transmitted to the transceiver according to:

$$EX_{66}(T_E) = COUNT_{66} + \Delta_{COUNT66} + OFFSET \quad (A)$$

In (1) $EX_{66}(T_E)$ is the expected value of the clock counter 66 at the next occurrence of the timing signal generated by the local timing extraction means 62. $COUNT_{66}$ is the value present in the clock counter 66 at the present occurrence of the timing signal. $\Delta_{COUNT66}$ is the expected increase of the clock counter 64 in the period between two subsequent occurrences of the timing signal. This value can be determined by subtracting the count values of the clock counter 66 at two subsequent occurrences of the timing signal. OFFSET is an offset value to be added to the expected value to compensate for the transmission delay of the transmission path 52.

The expected value $EX_{66}(T_E)$ is included into an ATM packet by applying it to the multiplexer 58. It should be ensured that the expected value arrives at the transceiver 54 well before the next timing signal is extracted by the timing extraction means 82.

The signal transmitted by the transceiver 50 is received by the transceiver 54 by means of a combination of an STM disassembler 77 and an ATM depacketizer 78. The STM disassembler 77 extracts a local clock signal from the data received from the transceiver 50 and supplies this local clock signal to a phase locked loop 88. An output of the phase locked loop 88 carries a clock signal synchronized to the clock signal generated by the clock oscillator 68. This output of the phase locked loop 88 is connected to the clock counter 86. In this way the clock counter 86 receives a clock signal which is synchronized to the clock signal generated by the oscillator 68.

The expected value calculated by the calculation means 64 is extracted by the demultiplexer 80 from the input signal and passed to a buffer 84. At the instant the timing signal is extracted by the timing extraction means 82, the received expected value is loaded into a clock counter 86. The instant at which the timing signal is extracted by the timing extraction means 82 is equal to $T_E + D_{52}$, in which $D_{52}$ is the transmission delay of the transmission link 52. At this instant $T_E + D_{52}$ the content of the clock counter 66 is equal to:

$$COUNT_{66}(T_E+D_{52}) = COUNT_{66} + \Delta_{COUNT66} + D_{52}/T_{CLOCK} \quad (B)$$

In (2) $T_{CLOCK}$ is the period of the clock signal supplied by the oscillator 68 to the clock counter 66. From (1) and (2) it can be seen that an error $\epsilon$ between the content of the clock counter 66 and the clock counter 86 exists. This error is equal to:

$$\epsilon = COUNT_{66}(T_E+D_{52}) - EX_{66}(T_E) = D_{52}/T_{CLOCK} - OFFSET \quad (C)$$

By making the value of OFFSET equal to $D_{52}/T_{CLOCK}$ perfect synchronization of the clock counters 66 and 86 is possible.

In order to enable the calculation means 64 to calculate the OFFSET value, the calculation means 64 need to know the delay of the transmission medium 52 and 56. Therefore an output of the clock counter 86 is connected to calculation means 90. The calculation means 90 receive from local timing extraction means 92 a timing signal indicating the transmission of a first byte of an ATM cell in a first byte of an STM frame. This timing signal is used to calculate an expected value of the clock counter 86 at the next occurrence of the timing signal. Because the oscillator in the PLL 88 is synchronized to the oscillator 68, there is a fixed time difference between the timing instants signaled by the timing extraction means 62 and the timing instants signaled by the timing extraction means 92. If it is assumed that the timing instants signaled by timing extraction means 92 occur at an instant $T_E + D_{52} + T_X$, for the expected value $EX_{86}$ of the clock counter 86 at the next occurrence of the timing signal can be written:

$$EX_{86}(T_E+D_{52}+T_X) = COUNT_{66} + \Delta_{COUNT66} + OFFSET + T_X/T_{CLOCK} \quad (D)$$

This expected value is applied to the multiplexer 96 which multiplexes the expected value with a payload signal of the transceiver 54.

The output signal of the multiplexer 96 is packed into ATM cells by an ATM packetizer 94. The ATM cells are assembled into G.704 compliant STM frames for transmission to the transceiver 50 via the transmission link 56.

At the transceiver 50, signal received from the transceiver 54 is processed by an STM disassembler 76 and an ATM depacketizer 74. The output of the ATM depacketizer 74 is connected to an input of a demultiplexer 72 which extracts the expected value of the clock counter 86 from the output signal of the ATM depacketizer 74. The expected value $EX_{86}$ of the clock counter 86 is passed to the calculation means 64 for determining the transmission delay of the channel. A timing signal generated by the timing extraction means 70 indicating the reception of the first byte of an ATM cell in a first byte of the STM frame is also passed to the calculation means 64. The timing signal provided by the timing extraction means 70 to the calculation means 64 occurs at an instant $T_R = T_E + D_{52} + D_{56} + T_X$. $D_{56}$ is the transmission delay in the transmission link 56. The delay of the transmission links are calculated by first determining the content of the clock counter 66 at the occurrence of the timing signal. Using (4), for this clock count value $COUNT_{66}(T_R)$ can be written:

$$COUNT_{66}(T_R) = COUNT_{66} + \Delta_{COUNT66} + (D_{52}+D_{56}+T_X)/T_{CLOCK} \quad (E)$$

By subtracting $EX_{86}$ and OFFSET from $COUNT_{66}(T_R)$ the value of $D_{52}+D_{56}$ is found. If it is assumed that the values of $D_{52}+D_{56}$ are equal, the value of $D_{52}$ can be found according to:

$$D_{52} = \frac{COUNT_{66}(T_R) - EX_{86} - OFFSET}{2} T_{CLOCK} \qquad (F)$$

By using the result of (3) the new value to be used for OFFSET for obtaining synchronization of the clock counters 66 and 86 is equal to the estimate of the delay $D_{52}$. If it is desired to perform some filtering on the value of OFFSET, the new value OFFSET(new) of OFFSET can be calculated according to:

$$OFFSET(new)=OFFSET(prev)+a\cdot(D_{52}-OFFSET(prev)) \qquad (G)$$

The value of a determines the time constant of the filter operation. Its value is a compromise between the acquisition time of the synchronization system and the suppression of undesired timing jitter.

What is claimed is:

1. A data transmission system comprising a first node for transmitting packets in a synchronous frame to a second node, wherein the second node comprises a timing extractor to extract a timing signal from the data when a predetermined symbol in a packet is received in a predetermined position in the frame.

2. The transmission system of claim 1, wherein the packets are each arranged to hold N symbols, and a timing signal is extracted every N frames.

3. The transmission system of claim 2, where the first node comprises a timing information transmitter to transmit a clock reference value to the second node, and the second node comprises a synchronizer to, upon the receipt of the clock reference value, synchronize a local clock with the clock reference value.

4. The transmission system of claim 1, where the first node comprises a timing information transmitter arranged to transmit a clock reference value to the second node, and the second node comprises a synchronizer to, upon the receipt of the clock reference value, synchronize a local clock with the clock reference value.

5. The transmission system of claim 4 wherein the clock reference value comprises the expected clock value upon the arrival of the next timing signal at the second node.

6. The transmission system of claim 5, where the second node further comprises:
a timing information transmitter arranged to transmit a clock reference value derived from its local clock back to the first node, and where the first node further comprises:
a clock synchronizer to set the clock reference value according to the clock reference value received from the second node.

7. A node in a data transmission system for receiving packets in a synchronous frame, comprising a timing signal extractor arranged to extract a timing signal from the data when a predetermined symbol in a packet is received in a predetermined position in the frame.

8. The node of claim 7, wherein each packet is arranged to carry N symbols, and the timing signal is extracted every N frames.

9. The node of claim 8, further comprising a timing information transmitter to transmit a clock reference value to a second node, where the second node comprises a synchronizer to, upon receipt of the clock reference value, synchronize a local clock with the clock reference value.

10. The node of claim 7, further comprising a timing information transmitter to transmit a clock reference value to a second node, where the second node comprises a clock synchronizer to synchronize its local clock with the received clock reference value upon its receipt.

11. A method for synchronizing at least two nodes in a data transmission system, said data transmission facilitating the transmission of packets in a synchronous frame from a first node to a second node, comprising:
extracting timing information when a predetermined symbol in a packet is transmitted from the first node in a predetermined position in the frame; and transmitting said timing information to the second node.

12. The method of claim 11, where the transmitted timing information comprises a clock reference value, and upon receipt of the timing information the second node synchronizes a local clock using said clock reference value.

* * * * *